Feb. 4, 1964   J. A. HERRMANN   3,120,627
BUS BAR ADAPTER FOR CIRCUIT BREAKERS
Filed July 24, 1961
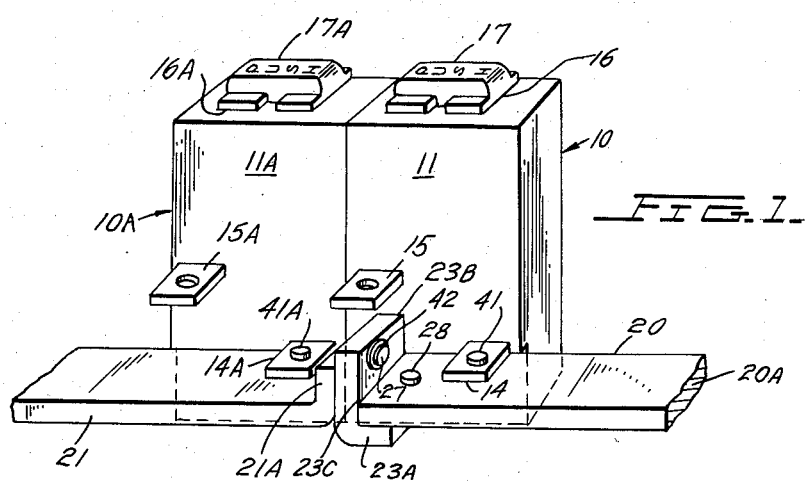
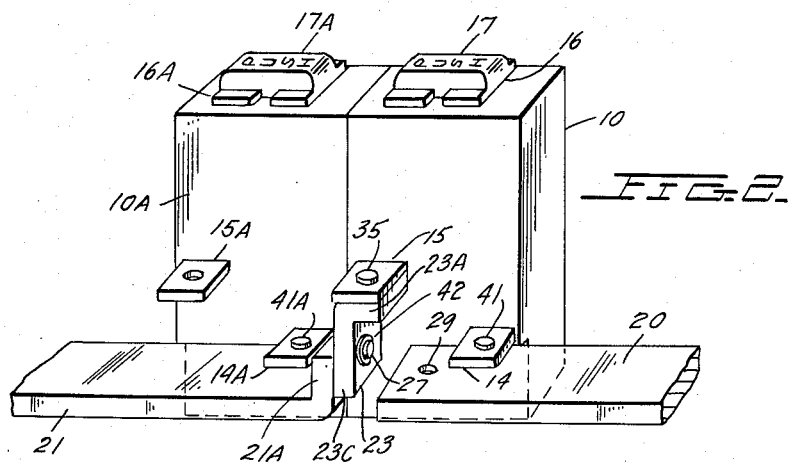
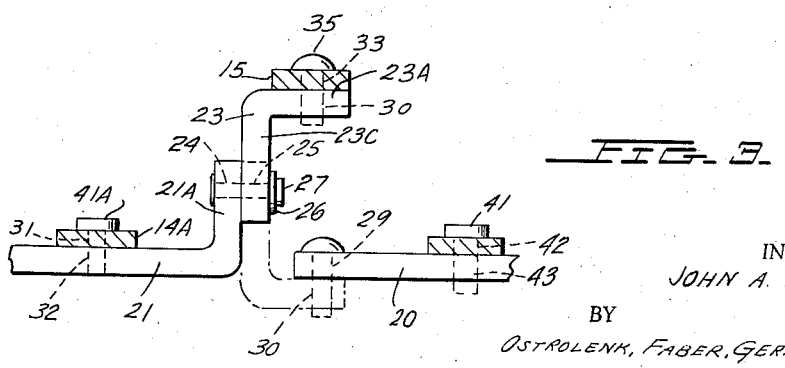
INVENTOR.
JOHN A. HERRMANN
BY
OSTROLENK, FABER, GERB & SOFFEN
ATTORNEYS 3,120,627
BUS BAR ADAPTER FOR CIRCUIT BREAKERS
John A. Herrmann, Grosse Pointe Farms, Mich., assignor to I-T-E Circuit Breaker Company, Philadelphia, Pa., a corporation of Pennsylvania
Filed July 24, 1961, Ser. No. 126,162
8 Claims. (Cl. 317—99)

This application relates to bus distribution centers and more particularly to a bus conductor arrangement which is so designed as to readily be converted from a one section straight feed type bus arrangement to a split feed two section bus arrangement.

In load distribution centers presently in use it is well known to employ a bus conductor which is so arranged as to accommodate a plurality of circuit breakers having their line terminals secured to the bus conductor so that the bus conductor acts as a central feeder line with the circuit breakers connected thereto being for the purpose of protecting an associated line which branches from the main feeder bus conductor. Each circuit breaker protects its individual branch from overload or short circuit current conditions by means of a high speed fault current responsive trip element.

However, if it is desired to isolate each of the branch circuits emanating from the main bus conductor, each individual circuit breaker must be manually operated to the open position. In order to overcome this time consuming operation, load distribution centers presently in use have employed disconnect switches at the line terminal end of the main bus conductor so that isolation of all branch circuits may be performed by the operation of the single disconnect switch. However switches of this type although they may be designed to perform a quick break, usually are not designed to perform a quick make operation for re-energizing the branch circuits.

The load distribution center of my invention is so designed as to permit the use of a regular circuit breaker for isolating all of the other circuit breakers connected to the main bus conductor by means of the isolating breaker. The isolating circuit breaker includes both quick break and quick make design features and is of the same design as the circuit breakers employed for the protection of the branch circuits thus avoiding the need for a special type breaker.

My invention is comprised of a bus conductor which is split into two portions at a predetermined point along its length. One of the ends of the first bus bar portion adjacent the split has a pivoted member which is so arranged as to be bussed solid to the second portion of the bus bar adjacent it to create a main lug interior straight through feed when the pivoted member is in a first position. The pivoted member when moved to a second position serves as the load terminal to the circuit breaker, which circuit breaker acts as the circuit connecting means between the two split portions of the bus bar. The pivoted member is so designed as to be connectable to a tap off circuit breaker which is of the same design and configuration as the circuit breakers which are employed as the protective elements for the branch circuits connected to the main bus bar. This arrangement enables the load distribution panel board to be uniform throughout, since the breaker which is employed to connect the split portions of the bus bar is of the same design and requires no more space than the other circuit breakers found in the panel board arrangement.

It is therefore one object of my invention to provide a panel board bus arrangement which is so designed as to be readily converted from a one section straight feed type bus bar to a split feed two section bus bar.

Another object of my invention is to provide a distribution center having a novel bus bar with a pivoted member having first and second positions for providing either a one section straight feed bus bar or a split feed two section type bus bar, depending upon the position in which the pivoted member is set.

These and other objects of my invention shall be readily apparent after reading the following description of the accompanying drawings in which:

FIGURE 1 is a perspective view showing my novel bus conductor and a circuit breaker connected thereto.

FIGURE 2 is a perspective view showing my novel bus bar arrangement connected in a split feed two section position.

FIGURE 3 is a front elevation view showing a more detailed view of my novel bus conductor of FIGURES 1 and 2.

Referring now to the drawings: FIGURE 1 shows first and second circuit breakers 10 and 10A arranged in a side by side fashion which is the normal arrangement in a load distribution on center panel board. Each circuit breaker has a lower or line terminal 14, 14A and an upper or load terminal 15, 15A which projects forwardly from front wall 11, 11A is positioned a predetermined distance above line terminals 14 and 14A respectively. An opening 16 and 16A in each circuit breaker 10, 10A serves to guide a handle or actuator 17, 17A formed as a push button. The details of circuit breaker 10 and 10A are more fully set forth in U.S. Patent No. 2,938,983 entitled "Circuit Breaker Latch" issued May 31, 1960 to R. W. Thomas and assigned to the assignee of the instant invention. Hence the details of the circuit breaker play no part in the novelty of the instant invention suffice it to say that the manual opening and closing operations of the breakers 10 and 10A are performed in the same manner by the depression of button 17 or 17A. A high speed current responsive trip element (not shown) is also provided in order to protect the load connected to the circuit breakers 10, 10A from fault current conditions. The rear walls of each breaker are so designed as to position and secure the circuit breakers to a rear mounting means (not shown). A bus conductor 20 is positioned adjacent circuit breaker 10 and immediately beneath line terminal 14 so as to be secured to line terminal 14 by means of a screw 41 which cooperates with tapped apertures 42 and 43 located in terminal 14 and bus conductor 20 respectively (see FIGURE 3). The line end 20A of conductor 20 is connected to the power source in any well known manner. A second bus conductor 21 is positioned adjacent bus conductor 20 so that its flanged portion 21A lies in close proximity to the left hand end of bus bar 20. An L-shaped conductive adapter member 23 is pivotally connected to the flange 21A by means of a rivet 27 which is inserted through apertures 24 and 25 in flange 21A and connecting part 23C of L-shaped member 23 respectively (see FIGURE 3). A spring type slit washer 26 is inserted between the rivet head 27 and the L-shaped member 23 to maintain proper surface contact pressure between L-shaped member 23 and flange 21A. A screw 28 is provided to securely fasten the left hand end of bus conductor 20 to the arm portion 23A of L-shaped member 23 wherein screw 28 is inserted through hole 29 in bus conductor 20 and tapped hole 30 in L-shaped member 23 respectively (see the dotted line portrayal in FIGURE 3). The connection between bus bars 20 and 21 provides a straight through feed between the two bus bars so that the circuit breaker 10A which is positioned to the left of the connection between the bus bars 20 and 21 is directly connected to the power source (not shown) which is connected to the line end 20A of bus conductor 20 in any well known manner. L-shaped member 23 is so designed so that when in the position of FIGURE 1 its upper edge 23B lies sufficiently below upper or load terminal 15 so as not to interfere with a connection made thereto. Line terminal 14A of circuit breaker 10A is mounted to bus conductor 21 in the same manner as circuit breaker 10 is mounted to bus conductor 20, namely by means of screw 41A which is inserted through aperture 31 in terminal 14A and tapped aperture 32 in bus bar 21 respectively. Thus circuit breaker 10 and 11A are arranged to receive loads (not shown) which are branch circuits of main feeder line 20—21.

In FIGURE 2 the L-shaped member 23 is pivoted from its angular position shown in FIGURE 1 to the position of FIGURE 2 so that the terminal arm 23A of L-shaped member 23 lies immediately beneath load terminal 15 of circuit breaker 10. A screw 35 is provided which is inserted through aperture 33 in load terminal 15 and tapped aperture 30 in arm 23A respectively to secure arm 23A to load terminal 15 (see solid line portrayal of FIGURE 3). The line terminal 14A of circuit breaker 10A is connected to bus bar 21 in the same manner as shown in FIGURES 1 and 3. The current path in the arrangement of FIGURE 2 however, differs from that of FIGURE 1 in that the current in flowing from the right hand end or line end 20A of bus bar 20 must first pass through circuit breaker 10 before passing to L-shaped arm 23 and bus bar 21. Thus it can be seen that any and all loads which lie to the left of circuit breaker 10 (such as circuit breaker 11A) may be completely isolated from the power source connected to line 20A simply by manually operating circuit breaker 11 to its open circuited position. When it is desired to reconnect the load which lies to the left of circuit breaker 10, the circuit breaker 10 is then manually operated to its closed position. The design of circuit breaker 10 is such that a quick-make closing operation takes place thus protecting the circuit breaker contacts during the closing operation which overcomes the disadvantages present in the closing operations of slower acting disconnect switches used in the prior art.

It should be understood that although only two circuit breakers are shown connected to the bus bars 20—21 more circuit breakers may be connected to the left and/or to the right of the circuit breakers 10 and 10A shown in FIGURES 1 and 2 the length of bus bars 20 and 21 being a mere design feature. In addition the split between the bus bars 20 and 21 may occur at any predetermined point along the bus run so that all of circuit breakers connected to the bus run may be isolated by the operation of one circuit breaker such as the operation of circuit breaker 10 shown in FIGURE 2 or by positioning the split between bus bars 20 and 21 at a predetermined distance away from the line end 20A of bus bar 20, a number less than all the circuit breakers connected to the bus run may be isolated from the line end 20A while circuit breakers (not shown) which are placed to the right of circuit breaker 10 will not be isolated from the line even though circuit breaker 10 be operated in its open circuited position.

The dimensions of L-shaped member 23 and flange portion 21A of bus bar 21 are such that bus bars 20 and 21 lie in the same horizontal plane thus assuring firm connections between these bus bars and the line terminal such as a line terminals 14, 14A of the circuit breakers 10 and 10A thus avoiding the necessity of supplying a circuit breaker having a line terminal which is positioned above (or below) the line terminals 14 and 14A shown in FIGURES 1 and 2 in order to be properly secured to the bus terminals.

Although I have here described preferred embodiments of my novel invention, many variations and modifications of the principles of my invention within the scope of the description herein are obvious. Accordingly, I prefer to be bound not by the specific disclosure herein but only by the appending claims.

I claim:

1. An electric power distribution means of the class described including first and second elongated buses with a gap between their ends; said first and said second buses having axially aligned first and second sections, respectively; an adapter having a terminal part and a connecting part; fastening means engaging said connecting part and selectively mounting said adapter in direct contact with said first bus in a first and a second position; said terminal part positioned adjacent to said second section for securement in direct contact therewith when said adapter is in said first position; said terminal part disposed remote from said second section in operative position for engagment by one terminal of a circuit interrupter pole unit whose other terminal is connected to said second bus bar when said adapter is in said second position.

2. An electric power distribution means as set forth in claim 1 in which the connecting part and the terminal part are at substantially right angles to each other.

3. An electric power distribution means as set forth in claim 2 in which the fastening means includes biasing means for maintaining contact pressure between said connecting part and said first bus bar.

4. An electric power distribution means as set forth in claim 2 in which the fastening means defines an axis about which said adapter is pivotally movable between said first and said second positions; said axis extending parallel to the axes of said first and said second sections of said buses.

5. An electric power distribution means of the class described including first and second elongated buses with a gap between their ends; said first and said second buses having axially aligned first and second sections, respectively; an adapter having a terminal part and a connecting part; fastening means engaging said connecting part and selectively mounting said adapter in direct contact with said first bus in a first and a second position; said terminal part positioned adjacent to said second section for securement in direct contact therewith when said adapter is in said first position; a circuit breaker having a housing and a first and a second terminal both extending from a single wall of said housing with said second terminal above said first terminal; means securing said first terminal in direct engagement with said second section; said terminal part disposed remote from said second section and adjacent to said second terminal for direct connection thereto when said adapter is in said second position.

6. An electric power distribution means as set forth in claim 5 in which the connecting part and the terminal part are at substantially right angles to each other.

7. An electric power distribution means as set forth in claim 6 in which the first bus bar includes an upturned flange adjacent to said gap; said fastening means directly engaging said flange.

8. An electric power distribution means as set forth in claim 7 in which the fastening means defines an axis about which said adapter is pivotally movable between said first and said second positions; said axis extending through said flange and parallel to the axes of said first and said second sections of said buses.

References Cited in the file of this patent
UNITED STATES PATENTS

| | | |
|---|---|---|
| 2,836,688 | Florschutz | May 27, 1958 |
| 2,837,699 | Fore | June 3, 1958 |
| 2,989,607 | Cellerini et al. | June 20, 1961 |